Figure 1:
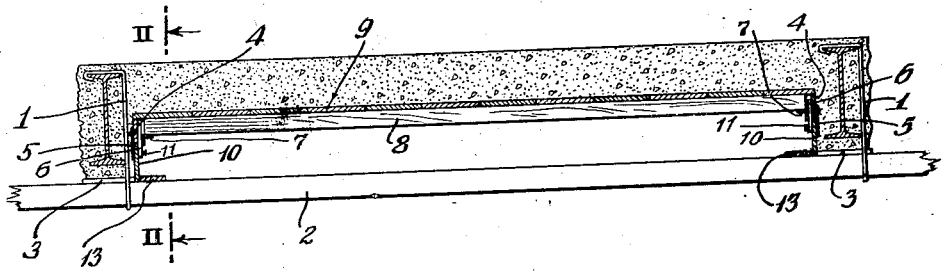

Aug. 17, 1926.

H. J. MOONEY 1,596,504

CONCRETE ARCH OR FLOORING MOLDING APPARATUS

Filed Sept. 6, 1924    2 Sheets-Sheet 1

INVENTOR
Harry J. Mooney
BY Jeffrey Kimball Eggleston
ATTORNEYS

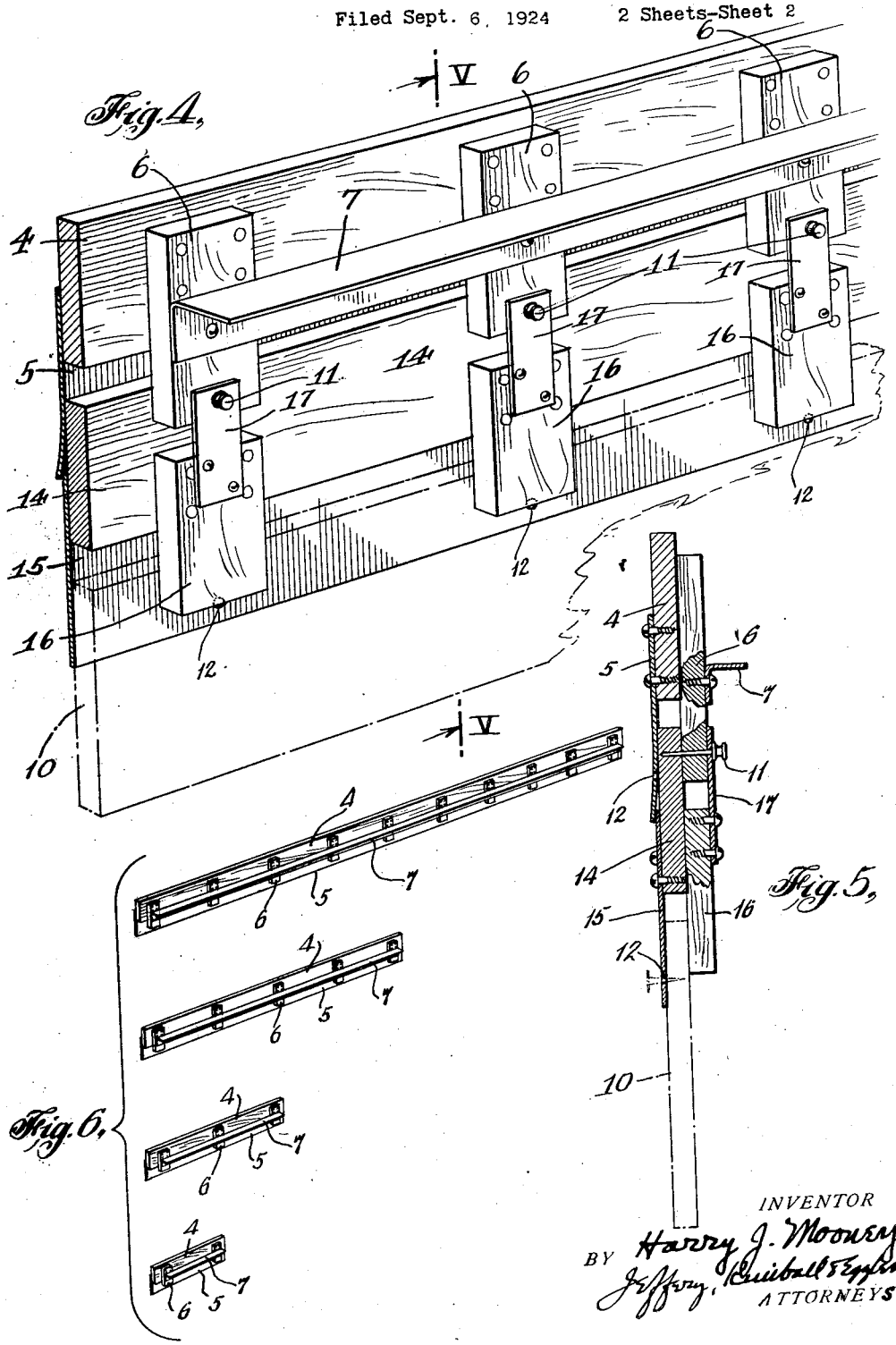

Patented Aug. 17, 1926.

1,596,504

UNITED STATES PATENT OFFICE.

HARRY J. MOONEY, OF RIDGEFIELD PARK, NEW JERSEY.

CONCRETE ARCH OR FLOORING MOLDING APPARATUS.

Application filed September 6, 1924. Serial No. 736,237.

Ideal structure of this character must be capable of ready and rapid expansion or contraction to meet the widely varying conditions of different jobs and must also be capable of handling by cheap labor and with low labor costs. This excludes heavy elaborate metal constructions with bolts to be fastened, etc., permanent frames and structures carrying at all times, whether needed or not, all or most of their parts, and implies on the contrary light, strong and cheap construction in which only so much as is then required need be used at any given time but which may be varied to suit the instant job.

With these considerations in mind, I have devised a system of basic and supplemental mold board sections having the several advantages hereinbelow pointed out or apparent to those skilled in the art and adapted individually or in association to cover, and even exceed, the entire range of standard construction, and have established standard lengths for all the sections, a unit length determined by the length of the heaviest basic section which a workman can readily carry, and fractions thereof.

Figure 2:
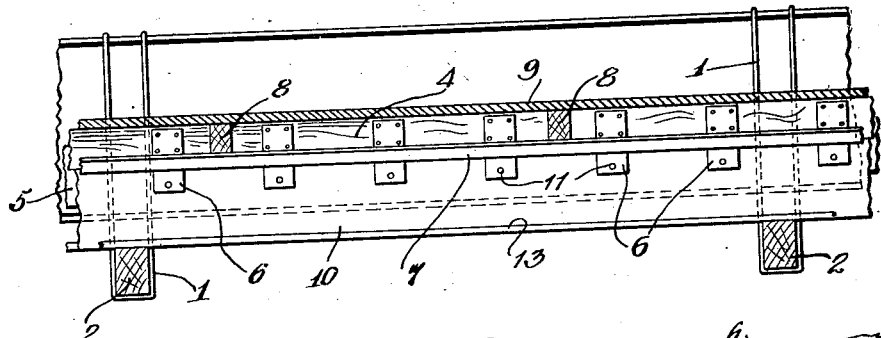
Figure 3:
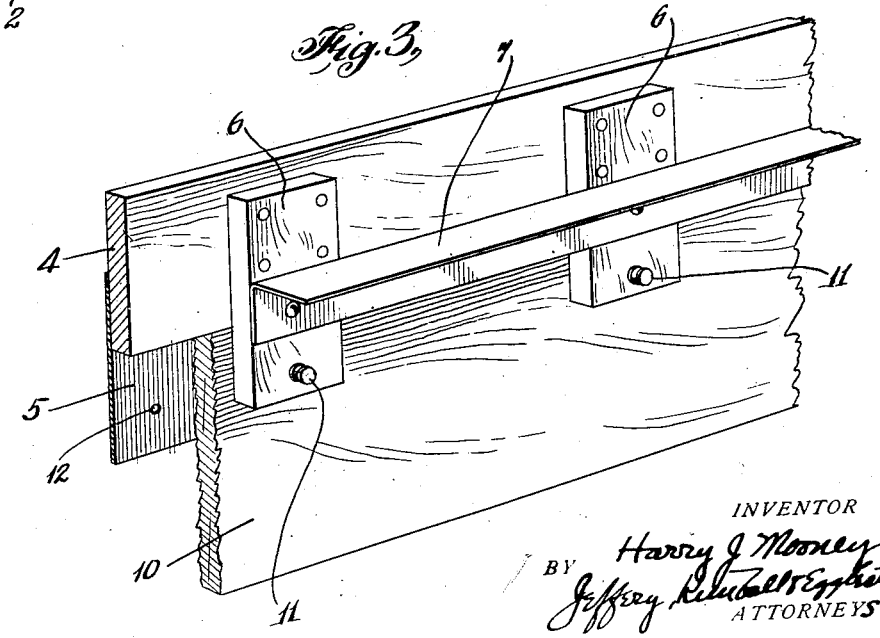

Referring to the drawings:

Fig. 1 is a horizontal section showing my mold board structure suspended from adjacent I beams. Fig. 2 is an enlarged vertical section on the line II—II Fig. 1. Fig. 3 is a perspective view showing the basic section with a supplemental mold board in place. Fig. 4 is a perspective showing the basic section, the intermediate or filler section, and in dot and dash lines, an extra mold board all associated for use. Fig. 5 is a vertical section on the line V—V, Fig. 4, and Fig. 6 is a series of perspective views of the basic section illustrating diagrammatically the several units of length of all the sections.

Avoiding all-metal construction as heavy and costly, and difficult and expensive to assemble, to handle and to adjust, and all-wood construction as cumbersome and likely to warp, I use a composite wood and sheet metal construction combining lightness with strength and made up of sections which may be temporarily secured together and their relative position or adjustment fixed and the total mold board width varied by tacking nails into wood as distinguished from the prior practice of bolting metal parts together, or of permanently nailing wooden boards together so that they can be ripped apart only with great difficulty. Temporary fixing of the adjustment at any place within the range of adjustment (instead of only in locations predetermined as by bolt holes, etc.) by tacking into wood, whether or not the wood is a molding surface, means an exact and a sufficiently assured adjustment for the particular job but admits of ready separation or readjustment of the parts where other requirements must be met. This is evidently very advantageous but it will be understood that my invention would still retain much of its value if other quick-releasable fastening means as pins or pegs each cooperating with any one of a series of vertically aligned holes were employed.

The entire mold board structure is suitably supported, preferably as in the illustrated embodiment (see Figs. 1 and 2) by suspension from adjacent I beams by wire hangers 1 supporting joists 2, on which rest the bottom boards 3, and the side mold boards—in this case the basic section whose wooden board 4 has permanently secured to its front, as by screws, the sheet metal face plate 5, and to its back the cleats 6, preferably of wood, which extend below the lower edge of the board 4 but stop well short of the lower edge of the plate 5, and which support the angle iron 7 on which rest the cross ribs 8 of the floor-molding panel 9. The basic section may rest directly on the joists 2 but as shown in Fig. 1 is extended in width by an extra mold board section 10 which fits into the space between the plate 5 and the cleats 6 into which it is guided by the projecting portion of the plate 5 and wherein it is properly retained by the cleats 6 which serve as keepers. The extra mold board section 10 may be in contact with the lower edge of the board 4 or spaced therefrom according to the size of the I beam and the thickness of the concrete floor. It is fixed in the desired position by tacking nails 11 through the holes 12 in the plate 5 or through the cleats 6 as may be the more convenient. By virtue of the keeper action of the cleats ordinary tacks or nails may be driven through the holes in the plates into the board member and left wth their heads projecting, as indicated in the lower part of Fig. 5 for quick removal, or if driven in completely and if long enough to extend through the wooden member, they may be driven out backwards, which, however, is less satisfactory. The nails or tacks may, for ready removal, be of the known form best shown in Fig. 5, and which have a double or spaced head so that they may be driven in completely, i. e. to the first head. Usual tie boards 13 prevent outward displacement of the side mold board structure.

Where the requisite width cannot be secured by the basic section alone, or by the basic section plus the utmost adjustment afforded by the addition of an extra mold board 10, a supplementary filler section is made use of. This filler section (shown in Fig. 4) has a wooden board or sheeting, 14, and a sheet metal plate 15 screwed thereto and cleats 16, preferably of wood, permanently fastened to the board and having extensions 17, which may be of metal, and which may have one or more nail holes. The filler section when constructed as illustrated may be interfitted with the basic section, the board 14 occupying the space between the plate 5 and the cleats 6, and the cleats 6 that between the board 14 and the cleat extensions 17, the transverse overlap being adjusted as desired and fixed by nails 11 driven through nail holes in the cleat extensions into the cleats 6 and preferably also into the board 14, or by nails driven from the other side through holes 12 in the plate 5 into the board 14. The mold board width may be still further increased by the insertion of an extra mold board 10 of suitable width between the plate 15 and the cleats 16 of the filler section and tacked in the desired adjustment by nails driven either through the cleats 16 or through holes 12 in the plate 15 into the wood.

The full range of I beams may be covered by using the basic section to take care of the usual (12") I beams, the basic section plus an extra mold board section of suitable width to take care of 15" to 20" I beams, and the basic section plus the filler section and if necessary, plus an extra mold board section, to take care of I beams over 20" which are used but seldom. A suitable width for the basic section is 9¾". Order and speed are promoted by adopting for all the sections a standard or "full length" which is the length of the basic section which one man can carry (say 12'), a "half length", (6'), a "quarter length", (3') and an "eighth length" (1' 6"), as indicated in Fig. 6.

The interfitting transversely overlapping, arrangement with the series of keeper cleats gives strength, which, where the filler section is used, is increased by the extra set of cleats and the cleat extensions. The sheet metal plates strengthen and prevent warping and the structure is relatively light.

Claims—

1. In concrete arch or flooring molding apparatus, a side mold board variable in width comprising a basic section provided with panel-supporting means, and a composite wood and metal filler section and an extra mold board section alternatively engageable with the basic section in transversely overlapping relation, and quick releasable means for temporarily securing the basic section and one of the other sections together.

2. In concrete arch or flooring mold board structure, a series of side mold board sections, one of which is a basic section having a wooden board and a sheet metal plate and panel-supporting means all permanently secured together, and the others of which are alternatively usable with the basic section, and have both a wooden board and one also a sheet metal plate permanently secured to its wooden board, and means for temporarily securing together all three of said sections or either of said sections alone to the basic section.

3. In concrete arch or flooring molding apparatus, a side mold board variable in width comprising a basic section provided with panel-supporting means, and a filler section adapted to engage the basic section and having adjacent each side edge spaces for receiving parts of side mold board sections and an extra mold board section alternatively engageable with the basic section in transversely overlapping relation, and quick releasable means for securing the basic section and one of the other sections together.

4. In concrete arch or flooring mold board structure, a basic section provided with panel supporting means, a filler section engageable with said basic section in transversely overlapping relation, one of said sections having a wooden board and a sheet metal plate secured thereto, and an extra mold board section alternatively enageageable in transversely overlapping relation with said basic section and with said filler section, and means for temporarily securing such mold board sections together.

5. In concrete arch or flooring mold board structure, two transversely interfitting mold board sections each comprising a wooden board having a sheet metal face plate extending transversely beyond it and keeper means secured to the wooden board projecting transversely beyond it and spaced to the rear of the sheet metal member thereby leaving space to receive a wood mold board member.

6. In concrete arch or flooring mold board structure, two transversely interfitting mold board sections each comprising a wooden board having a sheet metal face plate extending transversely beyond it, and wooden cleats secured to one of the wooden boards projecting transversely beyond it and spaced to the rear of the corresponding sheet metal member thereby leaving space to receive a wooden mold board member.

7. Concrete arch or flooring mold board structure comprising a floor-molding panel, a basic mold board section provided with means for supporting said panel, and having its upper part of wood faced on the concrete-molding side with a sheet metal plate extending below the lower edge of the wooden member, and having keeper means likewise extending below said lower edge and spaced from said plate, and a wooden side mold board member adapted to fit into the space between the plate and the keeper means, and quick releasable means for securing it to said basic member.

8. Concrete arch or flooring mold board structure comprising a floor-molding panel, a basic mold board section provided with means for supporting said panel, and having its upper part of wood faced on the concrete-molding side with a sheet metal plate extending below the lower edge of the wooden member, and having a series of cleats likewise extending below said lower edge and spaced from said plate, and a wooden side mold board member adapted to fit into the space between the cleats and plate and means for securing it releasably at any point of transverse adjustment with reference to said basic member.

9. In concrete arch or flooring molding apparatus, mold board supporting means, a composite metal and wood side mold board having a sheet metal plate and a wooden board, said metal plate and wooden board being relatively adjustable in the direction of their width, and nails driven into the wood for fixing the parts in any desired position within the range of adjustment.

10. In concrete arch or flooring molding apparatus, mold board supporting means, a composite side mold board section having a wooden board and a sheet metal face-plate permanently secured thereto, and another side mold board section having a wooden board behind the face plate, and quick-releasable means for securing said sections temporarily together.

11. In concrete arch or flooring molding apparatus, mold board supporting means, a composite metal and wood side mold board section having a sheet metal face-plate and a wooden board permanently secured together and another mold board section having a wooden board, said composite mold board section and said other mold board section being relatively adjustable in the direction of their width, and nails driven through part of one of said mold board sections into the wood of the other for releasably fixing the parts in any desired position within the range of adjustment.

12. In concrete arch or flooring mold board structure, a basic mold board section having means for supporting a floor-molding panel and a separate wooden side mold board member having capability of relative adjustment in the direction of their width, and quick releasable means for fixing said basic section and said wooden side mold board member in adjustment.

13. In concrete arch or flooring molding apparatus, mold-board supporting means, a composite side mold board section having a wooden board and a sheet metal face-plate permanently secured thereto, and another side mold board section having a wooden board behind the face-plate, said parts being relatively adjustable, and nails driven through a part of the composite mold board section into the wooden board for fixing the parts temporarily together in any desired position within the range of adjustment.

14. In concrete arch or flooring mold board structure, a basic mold board section having means for supporting a floor-molding panel, and a side mold board section capable of relative adjustment in the direction of their width, one of said relatively adjustable sections having a wooden member, and nails driven through the other of said adjustable members into said wooden member with their heads projecting and constituting quick-releasable means for fixing any desired adjustment.

15. In concrete arch or flooring mold board structure, a basic mold board section having means for supporting a floor-molding panel, and a side mold board section capable of relative adjustment in the direction of their width, one of said relatively adjustable sections having a wooden member, keeper means for said wooden member carried by the other adjustable member, and nails driven through the other of said adjustable members into said wooden member with their heads projecting and constituting quick-releasable means for fixing any desired adjustment.

16. In concrete arch or flooring side mold board structure, a side mold board having a wooden board, keeper means secured to one side of the wooden board and projecting beyond its edge and a sheet metal plate secured to the other side of the wooden board and projecting beyond its edge, said plate and keeper means projecting unequal distances to furnish a recess and guide thereto for another side mold board member.

17. In concrete arch or flooring side mold board structure, a side mold board having a wooden board, cleats secured to one side thereof and projecting beyond the edge of the wooden board and a sheet metal plate secured to the other side of said wooden board and extending beyond the projecting ends of the cleats.

18. In concrete arch or flooring side mold board structure, a side mold board section, and a composite side mold board section having a wooden board to opposite sides of which are respectively permanently secured wooden cleats and a sheet metal plate both extending beyond the edge of the board and one extending further than the other to furnish a guide for the other mold board section into the space between said plate and cleats which it substantially fits.

19. In concrete arch or flooring side mold board structure, a side mold board section, a composite side mold board section having a wooden board to opposite sides of which are respectively permanently secured wooden cleats and a sheet metal plate both extending beyond the edge of the board and one extending further than the other to furnish a guide for the other mold board section into the space between said plate and cleats which it substantially fits, and quick-releasable means for temporarily securing said mold board sections together.

20. In concrete arch or flooring mold board structure, a series of separate side mold board sections of different types some of which have a wooden member and some or all of which may be temporarily secured together to form side mold board of different width, and quick-releasable means for securing the selected sections together.

21. In concrete arch or flooring mold board structure, a composite mold board section having a wooden board and a sheet metal plate permanently secured thereto, another mold board section also having a wooden board, and double headed nails constituting quick-releasable means for fastening the sections temporarily together.

22. In concrete arch or flooring mold board structure, a mold board comprising a sheet metal plate and a wooden board relatively movable transversely to vary the total width of the side mold board, and double-headed nails constituting quick-releasable means for fastening the plate and board temporarily together.

23. In concrete arch or flooring molding apparatus, a side mold board filler section having permanently secured together a wooden board, a sheet metal face plate and wooden cleats secured respectively to opposite sides of said board and projecting beyond one edge of it, and cleat extensions carried by said cleats adjacent their other ends and at one side of the plane of the cleats and providing a space at one side of the filler section between said cleat-extensions and wooden board, and a space at the other between the plate and the cleats.

24. In concrete arch or flooring molding apparatus, a basic side mold board section having a wooden board, a sheet metal face plate and cleats permanently secured respectively to opposite sides of the wooden board and extending below the lower edge thereof, so as to leave a space at the bottom of the basic section and panel-supporting means also permanently secured to said board, and a side mold board filler section also having a wooden board and a sheet metal face plate permanently secured to the wooden board and extending below its lower edge, the wooden board of the filler section being adapted to be located in the space between the cleats and the sheet metal plate of the basic mold board section, and means for temporarily securing said two sections together.

25. In concrete arch or flooring molding apparatus, a basic side mold board section having a wooden board, a sheet metal face plate and cleats permanently secured respectively to opposite sides of the wooden board and extending below the lower edge thereof, so as to leave a space at the bottom of the basic section and panel-supporting means permanently secured to said board, and a side mold board filler section also having a wooden board and a sheet metal face plate and cleats permanently secured thereto on opposite sides thereof and extending below its lower edge, the wooden board of the filler section being adapted to be located in the space between the cleats and the sheet metal plate of the basic mold board section, the cleats of the filler section having extensions constituting keeper members spaced from the wooden board of the filler section to receive the cleats of the basic section between themselves and the wooden board of the filler section, and means for temporarily securing said two sections together.

26. In concrete arch or flooring molding apparatus, a basic side mold board section having a wooden board, a sheet metal face plate and wooden cleats permanently secured respectively to opposite sides of the wooden board and extending below the lower edge thereof so as to leave a space at the bottom of the basic section, and a composite filler section having a wooden board and a sheet metal plate and wooden cleats permanently secured respectively to opposite sides of the wooden board of the filler section, and cleat extensions carried by the cleats of the filler section and leaving a space at the upper part of the filler section between themselves and the wooden board thereof for the receipt of the cleats on the basic section, and means for temporarily securing the two sections together.

27. In concrete arch or flooring molding apparatus, a basic side mold board section comprising a wooden board and a sheet metal face plate and cleats secured to opposite sides of the wooden board and extending beyond the lower edge thereof, and a panel-supporting means all permanently secured to said wooden board.

28. In concrete arch or flooring mold board structure, a basic side mold board section comprising a wooden board, a sheet metal plate secured thereto and extending below the lower edge thereof, wooden cleats secured at intervals to the back of the wooden mold board and also extending below the lower edge thereof and a floor-molding panel-supporting angle iron secured to the cleats.

29. In concrete arch or flooring molding apparatus, mold board supporting means, a composite metal and wood side mold board having a sheet metal plate and a wooden board and provided with panel-board-supporting means, said metal plate and wooden board being relatively adjustable in the direction of their width, and nails driven through a part of the side mold board into the wood for fixing the parts in any desired position within the range of adjustment.

30. In concrete arch or flooring molding apparatus, mold board supporting means, a composite side mold board section having panel-supporting means and having a wooden board and a sheet metal face-plate permanently secured thereto, and another side mold board section having a wooden board behind the face plate and quick-releasable means for securing said sections temporarily together.

31. In concrete arch or flooring mold board structure, a composite mold board section having a wooden board and a sheet metal plate permanently secured thereto, another mold board section also having a wooden board, one of said sections having panel-board supporting means, and nails driven through a part of one of the sections into wood of the other for fastening the sections temporarily together in any desired position of widthwise adjustment.

32. In concrete arch or flooring mold board structure, two transversely interfitting mold board sections each comprising a wooden mold board and one of them comprising also a sheet metal face plate extending transversely beyond its wooden mold board and keeper means secured to this wooden mold board and also projecting transversely beyond it and leaving space to receive the other wooden mold board, and nails driven through part of one of said sections into a wooden part of the other to secure them temporarily together.

33. In concrete arch or flooring mold board structure, a side mold board filler section having permanently secured thereto a wooden board, a sheet metal face plate and keeper means secured respectively to opposite sides of said board and projecting beyond one edge of it to form a recess adapted to receive another mold board section, and keeper means forming a space near the opposite edge of the mold board filler section adapted to receive another mold board section.

34. In concrete arch or flooring mold board structure, a basic section having panel-supporting means and having at one edge a mold-board-receiving recess, a mold board filler section having a wooden board adapted to be engaged in said recess and having adjacent to said board keeper means forming a recess for receiving part of the basic mold board section, and having a mold board receiving recess at its other edge.

In testimony whereof, I have signed this specification.

HARRY J. MOONEY.